United States Patent [19]
Kish et al.

[11] 3,812,480
[45] May 21, 1974

[54] CODE TRANSLATOR EMPLOYING SEQUENTIAL MEMORIES

[75] Inventors: Donald Eugene Kish, North Plainfield; James Lanson Smith, Bedminster, both of N.J.

[73] Assignee: Bell Telephone Laboratories, Incorporated, Murray Hill, N.J.

[22] Filed: Nov. 15, 1972

[21] Appl. No.: 306,732

[52] U.S. Cl. ...................... 340/174 TF, 340/174 SR
[51] Int. Cl. ........................ G11c 11/14, G11c 19/00
[58] Field of Search ................. 340/174 TF, 174 SR

[56] References Cited

UNITED STATES PATENTS

| | | | |
|---|---|---|---|
| 3,508,225 | 4/1970 | Smith | 340/174 TF |
| 3,711,842 | 1/1973 | Chow | 340/174 TF |
| 3,743,788 | 7/1973 | Krupp et al. | 340/174 TF |
| 3,701,132 | 10/1972 | Bonyhard et al. | 340/174 TF |
| 3,737,881 | 6/1973 | Cordi et al. | 340/174 TF |

OTHER PUBLICATIONS

IBM Tech. Disc. Bulletin, "Magnetic Domain Data Storage System With Multifunctions Encodes/-Decodes," by Grubb et al., Vol. 15, No. 3, 8/72.

*Primary Examiner*—Stanley M. Urynowicz, Jr.
*Attorney, Agent, or Firm*—H. M. Shapiro

[57] ABSTRACT

The introduction of single wall domains (magnetic bubbles) into coded positions of a pair of domain recirculating loops enables the provision of control signals at anyone of a number of possible time slots with relatively few external wiring connections. The transfer of a domain from each loop of the pair to a control loop responsive to the presence of a domain in a reference stage in each loop permits the formation of a two-bubble code in the control loop for determining the timing of the signals. The three loops define a practical translator which can be integrated into a single domain chip.

10 Claims, 4 Drawing Figures

CODE TRANSLATOR EMPLOYING SEQUENTIAL MEMORIES

FIELD OF THE INVENTION

This invention relates to magnetic storage apparatus, and more particularly to such apparatus in which information is stored as patterns of single wall domains commonly known as magnetic bubbles.

BACKGROUND OF THE INVENTION

Bubble memories such as mass sequential memories and memories for repertory dialers are well known in the art. One mode of operating a bubble memory employs a pattern of magnetically soft elements adjacent the surface of a magnetic layer in which bubbles can be moved. A magnetic field reorienting in the plane of the layer generates pole patterns in the elements for producing changing field gradients which effect bubble movement in what is called a "field access" mode of operation.

A typical bubble memory requires a variety of operations which occur in a timed sequence as is also well known. The timing is an important function, not only for normal control of the operations performed by such arrangements, but also for reestablishing normal operation if failures occur. It is advantageous for such timing to be supplied by what is commonly referred to as a "housekeeping" loop and convenient that such a loop be defined by the same bubble implementation which defines the bubble memory. The timing function thus is performed conveniently by introducing a bubble code into coded initial positions in a housekeeping loop operative in a field access mode synchronously with a field access memory. The timing is determined by the number of cycles of the reorienting field required for the advancement of the bubbles from the initial positions to a preset control position in the loop.

An important aspect of such a housekeeping loop arrangement is a code translator operative to permit introduction of bubbles into a sufficient number of different initial positions in the loop to achieve the timing flexibility for normal operating procedures with a minimum number of external electrical connections. For a repertory dialer, for example, a minimum of 51 external connections normally would be required to hard wire sufficient codes for operation.

BRIEF DESCRIPTION OF THE INVENTION

In accordance with this invention, on the other hand, two closed loop bubble channels, the numbers of stages in which are relatively prime, are employed to achieve a large number of codes with relatively few external connections. The term "relatively prime" herein means that the numbers of stages in the two loops have no common factor other than unity. A bubble is introduced into each channel in a coded position and is recirculated past a transfer port (or reference position) in each until the bubbles arrive at the associated ports simultaneously. The channels are designed in practical arrangements so that the simultaneous arrival of the bubbles at the two ports in the two channels results in the transfer of the bubbles into consecutive stages of one of the loops, or, alternatively, of a third loop operative as the housekeeping loop.

The illustrative translator provides two recirculating loops with up to 56 codes and only 15 external connections. Of course, more than two translator loops may be employed to provide an increased number of codes with even fewer external connections than would be required of a two-loop arrangement.

DETAILED DESCRIPTION

Figure 1:
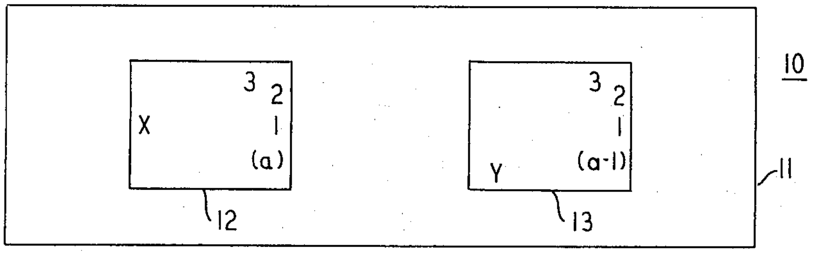
FIG. 1 is a line diagram of an arrangement in accordance with this invention.

FIG. 1 shows a generalized coding arrangement 10 including a layer 11 of material in which single wall domains can be moved. Lines 12 and 13 represent closed loop channels for moving single wall domains thereabout and may be considered to represent loops defined by familiar T- and bar-shaped elements operative in a field access mode in response to a magnetic field rotating in the plane of layer 11.

Consider a single wall domain at each of arbitrary, initial positions X and Y in the loops. If loops 12 and 13 include $a$ and $a$-1 stages, respectively, and if $X = a$ and $Y = a-1$, the two domains arrive at (the reference) positions 1 simultaneously after movement through $(a)(a-1)$ bit positions. For any positions where $X \neq Y$, at least one full revolution of loop 13 is required before the domains arrive in positions 1 simultaneously. In general, then, the count N for the number of bit locations or stages through which the domains pass before arriving synchronously at positions 1 is:

$$N = \begin{cases} (Y-X)(a-1) + Y \text{ if } Y \geqslant X \\ (Y+a-X)(a-1) + Y \text{ if } Y \leqslant X \end{cases} \quad (1)$$

where $a$ is added to Y only if Y - X is negative. Thus, we have established a pair of domain recirculating loops which provide domains simultaneously at reference positions only after movement through a number of stages determined by the positions which the two domains occupy initially in the loops.

External connections to introduce domains into those positions need be only as numerous as the number of positions in the loops. For a conventional 48 number repertory dialer, $a(a-1) \geqslant 48$, and a (for example) = 8. Consequently, only fifteen bit locations or stages are necessary — one 8-bit channel and one 7-bit channel. Of course, only 15 external connections, one to each of those stages, are necessary also.

Figure 2:
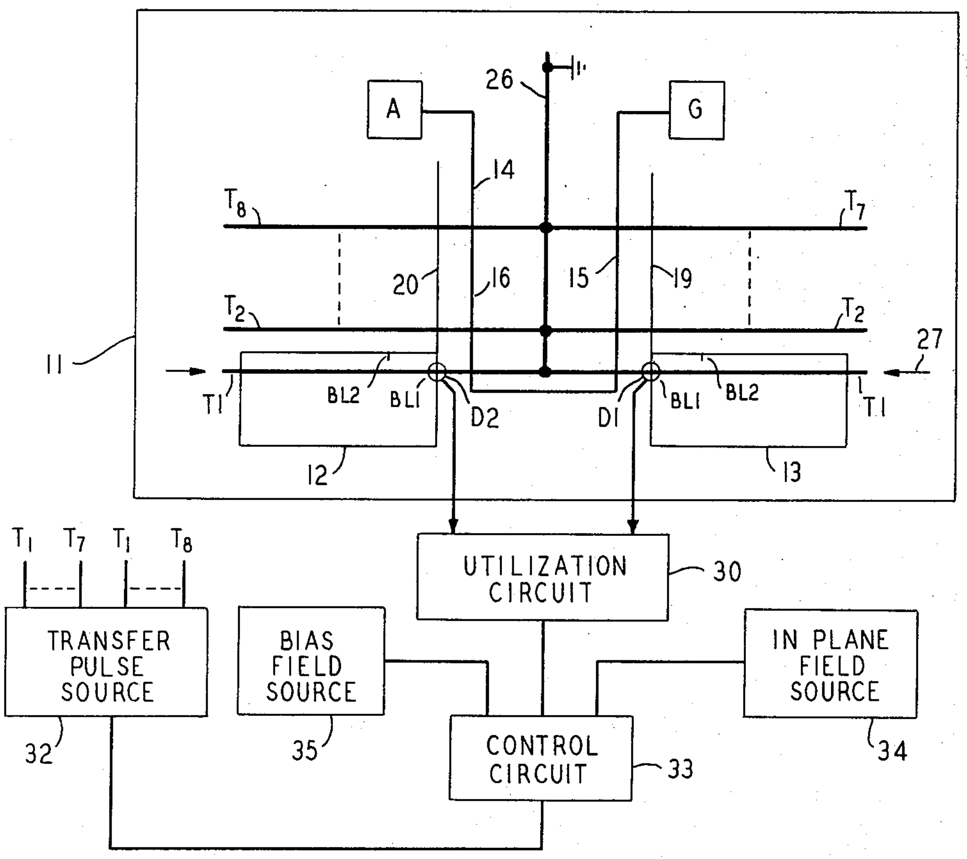
FIGS. 2, 3, and 4 are schematic representations of code translators in accordance with this invention.

FIG. 2 shows closed loops 12 and 13 associated with an additional domain propagation (input track or) channel 14. Channel 14 is operative as a practical input arrangement for the placement of domains into the coded positions of loops 12 and 13 by means of extensions of those loops which permit simplification of the pattern of external connections. Channel 14 is shown originating at a generator G and terminating at a domain annihilator A. Domains generated at G move along a path which includes first and second multistage straight leg sections 15 and 16 in response to the rotating in-plane field. Sections 15 and 16 are parallel with and closely spaced with respect to extensions 19 and 20 of closed loop paths 13 and 12, respectively.

Extensions 19 and 20 originate at locations BL1 of loops 13 and 12 and comprise seven and eight stages (including locations BL1 of the associated loops), respectively. Leg sections 15 and 16 also include eight and seven stages, respectively. A domain in a given position in extension 19 or 20 ultimately advances in response to the rotating in-plane field to occupy a corresponding location of the associated loop 12 or 13. Thus, the transfer of a domain to the extension 19 or 20 results in the positioning of the transferred domain in the selected location of the associated recirculating loop. 15 electrical conductors T1 to T7 for loop 13 and T1 to T8 for loop 12, connected to ground by means of a common lead 26, couple layer 11 in a manner to transfer domains selectively from input track 14 to a position in an extension and thus to a given position of each closed loop.

In operation, a domain generated in channel or track 14 at G is transferred to a selected location of one of the closed loop paths depending on which "transfer" conductor is pulsed. Consider, channels 12, 13, and 14 to be defined, for example, by T- and bar-shaped elements, as stated previously. In this mode of operation all domains in layer 11 advance one bit location or stage for each cycle of the rotating in-plane field. Assume, in FIG. 2, that domains in channels 12 and 13 circulate clockwise and counterclockwise respectively as viewed with movement in extensions 19 and 20 being downward and domain movement in track 14 being from G to A. Further, consider generator G to be operative to fill channel 14 completely. That is to say, channel 14 has a domain in each of its fifteen bit locations. Consequently, when a transfer conductor is pulsed, it transfers a domain into the extension of loop 12 or 13 to a position there selected to be equal to the number of bit locations between the selected bit location in a loop and the associated home position (BL1).

It follows, then, that a transfer pulse applied to conductor T1 between arrow 27 and ground at the common lead 26 transfers a domain directly into position BL1 (the reference or home position) in loop 13. If conductor T2 were pulsed instead, a domain would have been transferred to a position in extension 19 once removed from position BL1 occupying the next subsequent position (cmpre: BL2, FIG. 2) when the in-plane field reorients through its next cycle. Similarly, had conductor T7 been pulsed, domain transfer to a bit location in extension 19 seven positions from the home position of loop 13 occurs for occupying the seventh subsequent position corresponding to position BL7. Therefore, the transfer operation functions to transfer a domain to a selected position in loop 13 via the extension 19.

Of course, selective pulsing of conductors T1 to T8 associated with loop 12 similarly operates via extension 20 to transfer a domain to one of eight positions in loop 12. If we pulse simultaneously one of conductors T1 to T7 (loop 13) and one of conductors T1 to T8 (loop 12), a domain is placed in a coded position in the extension of each of the two channels. Recirculation of the domains down the extensions and into the loops continues in response to repeated rotations of the in-plane field until the two domains occupy the home positions (BL1) simultaneously.

Detectors D1 and D2 are located at the home positions (BL1) as shown in FIG. 2 for applying a signal to a utilization circuit 30 when domains occur in the home positions simultaneously. That signal occurs in one of say 48 (actually up to 56) time slots depending on the positions to which domains were transferred initially into loops 12 and 13 in accordance with the following table:

| X<br>8-Stage Loop (12) | Y<br>7-Stage Loop (13) | Time Slot |
|---|---|---|
| 1 | 1 | 1 |
| : | : | : |
| 7 | 7 | 7 |
| 8 | 1 | 8 |
| 1 | 2 | 9 |
| : | : | : |
| 6 | 7 | 14 |
| 7 | 1 | 15 |
| 8 | 2 | 16 |
| 1 | 3 | 17 |
| : | : | : |
| 5 | 7 | 21 |
| 6 | 1 | 22 |
| 7 | 2 | 23 |
| 8 | 3 | 24 |
| 1 | 4 | 25 |
| : | : | : |
| 4 | 7 | 28 |
| 5 | 1 | 29 |
| 6 | 2 | 30 |
| 7 | 3 | 31 |
| 8 | 4 | 32 |
| 1 | 5 | 33 |
| : | : | : |
| 8 | 5 | 40 |
| 1 | 6 | 41 |
| : | : | : |
| 8 | 6 | 48 |

The selection (transfer) pulses are applied to conductors T1 to T7 and to conductors T1 to T8 for loops 13 and 12, respectively, by a transfer pulse source represented by block 32 of FIG. 2 under the control of a control circuit 33.

The rotating field for effecting synchronous domain movement in the field access mode of operation is supplied by a source represented by block 34 of FIG. 1. Domains, in the operation of a practical bubble arrangement, are maintained at an operative diameter by a bias field supplied by a source 35.

Rather than employing two detectors for providing a timing signal, the arrangement of FIG. 2 can be modified to operate to transfer the domain, which occupies the one (home) position in loop 13 into loop 12 under the condition that the home position (BL1) in loop 12 is also occupied. The result is a code of two consecutively filled positions in loop 12 requiring only a single detector in that loop for detection.

Figure 3:
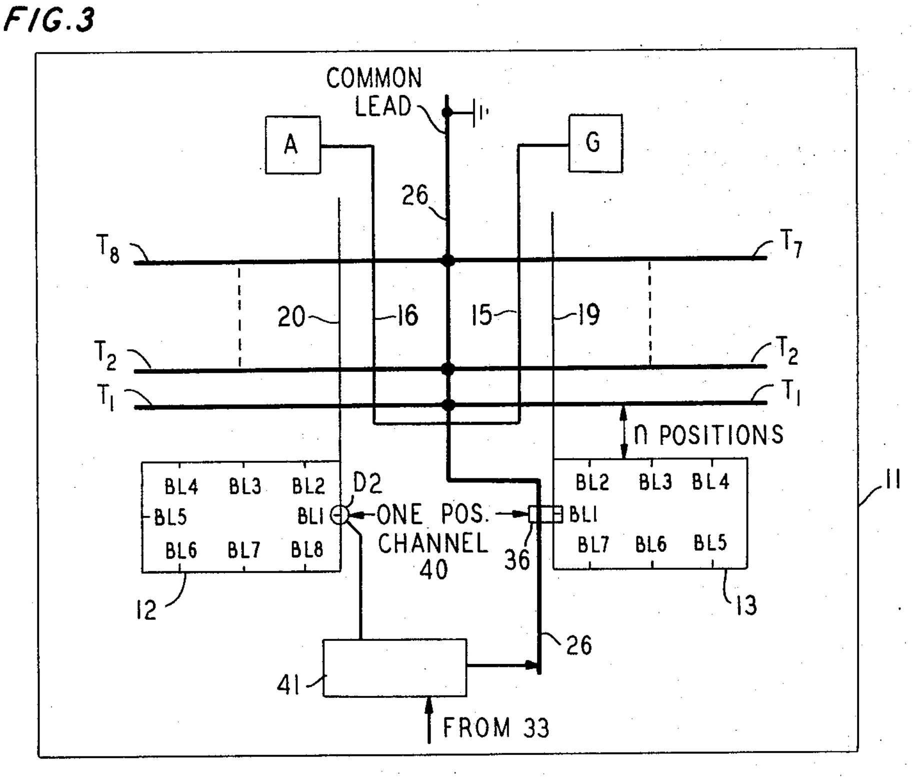

FIG. 3 shows such an arrangement and the organization of the arrangement along with its operation will now be described. The figure shows basically a modification of the arrangement shown in FIG. 2 where loops 12 and 13 are shown again including 8 and 7 bit locations BL1, BL2–BL8 and BL1, BL2–BL7, respectively. The transfer conductors are designated, as before, T1 to T8 and T1 to T7 for loops 12 and 13 and are separated from the loops by $n$ additional domain positions along extensions 19 and 20, where $n$ is a multiple of the number of bit locations in the associated loop to ensure convenient positioning of transferred domains.

FIG. 3 also shows the common lead (26) of FIG. 2 extended downward beyond conductor T1 along a path in close proximity with loop 13. The lead is pulsed to activate a transfer port 36 at position BL1 in loop 13. The transfer port can be understood to replace detector D1 of FIG. 2 and is operative to transfer a domain in position BL1 of loop 13 into a "one-position" domain channel 40 (a channel with only a single bit position) for movement into position BL1 of loop 12. Transfer occurs only when a domain is detected at position BL1 of loop 12 by detector D2. The detector, in response, actuates a pulse source represented by block 41 of FIG. 3 for applying the transfer pulse to common lead 26. The transferred domain is moved to position BL1 of loop 12 only one position behind the detected domain. Coincidence of domains at positions BL1 in loops 12 and 13, consequently, is recognized by the presence of two domains in consecutive positions of loop 12.

Figure 4:
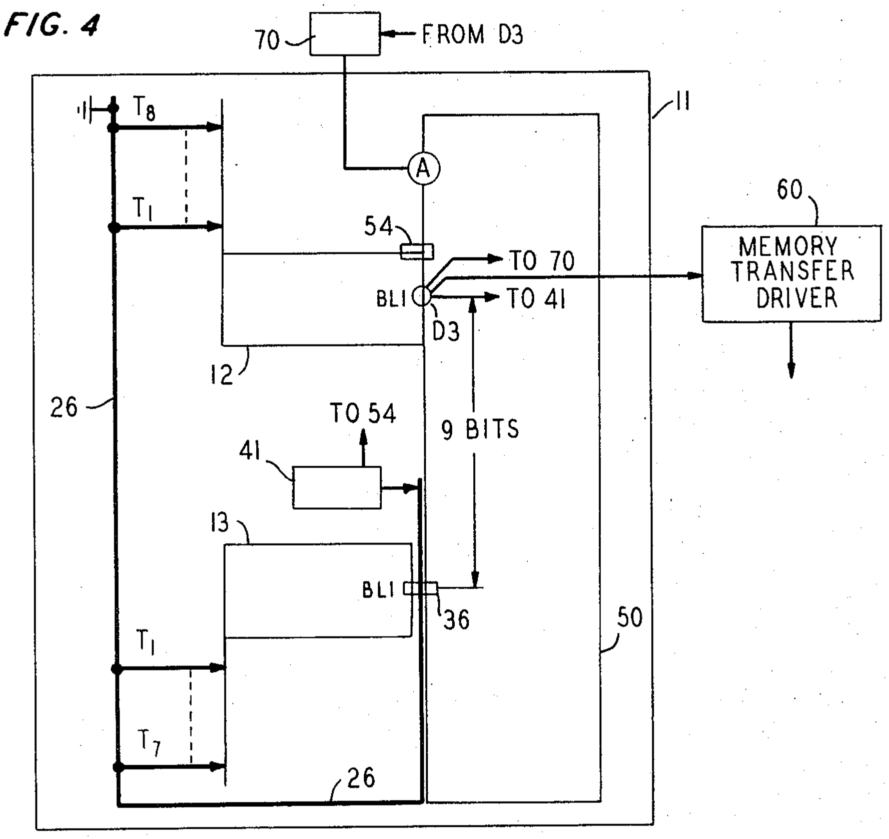

FIG. 4 shows a further modification of the arrangement of FIG. 2 where closed loops 12 and 13 are rearranged to simplify the interconnection of external leads from the left as viewed to permit an additional loop 50 to be added to the arrangement in a convenient manner. Like designations are used in the figure to facilitate comparison with previous figures.

The major modification appears at loop 12. Loop 12 closes, to the right as viewed in FIG. 4, normally through a portion of additional loop 50 so that recirculating information there actually passes through a portion of loop 50. A detector D3 at position BL1 of loop 12, in response to the presence of a domain there, activates a pulse source 41 (compare FIG. 3). Pulse source 41, in response, applies a transfer pulse, via common lead 26, to transfer port 54. The transfer port, in turn, is operative to reenter a domain into loop 12.

Pulse source 41 also applies a pulse to lead 26 to activate the transfer port (36) of loop 36 for transferring to loop 50 any domain which occupies bit location BL1 of loop 13 when a domain is detected by detector D3. If no domain occupies bit location BL1 of loop 13 at this juncture, the detected bit in loop 12 merely recirculates. On the other hand, if bit location BL1 of loop 13 is occupied by a domain, that domain is transferred to loop 50 at a point a number of positions away from detector D3 to permit the domain in loop 12 to be positioned, when next at detector D3, either one position ahead of or one position behind the domain from loop 13. Thus, a two-domain code in loop 50 is established. Nine (or seven) bit positions in channel 50 between detector D3 and the transfer port of loop 13 would be satisfactory for this purpose. Detector D3 is responsive to the detection of the two-domain code to inhibit pulse source 41 from activating transfer port 54 to effect transfer of a domain back into loop 12. Transfer port 54 is placed two bit locations from detector D3 for convenience in this connection.

Loop 50 may be considered to be a housekeeping loop for a magnetic domain memory, comprising a coded sequence of two domains for controlling the operation of such a memory. Consider, for example, the well-known "major-minor" organization of bubble memories. Information transfer between minor loops and a major loop is required in such memories. Thereafter, return of the transferred information to the minor loops is required. When detector D3 of FIG. 4 detects a two-domain sequence, it is operative to apply a signal to a memory transfer driver 60 of FIG. 4. Driver 60 applies a transfer signal to effect the transfer of a bit from each minor loop (not shown) in memory to the major loop (not shown). If each minor loop is considered to include 48 bits, then it can be appreciated that the translator is operative to select the bits (and thus the word) transferred to the major loop. Loop 50 includes a sufficient number of domain positions to permit the two-domain sequence to return to detector D3 in the same time (number of in-plane field cycles) it takes the information in the major loop to recirculate to the positions at which entry into the major loop occurred. Detector D3, at this juncture, again senses a two-domain code and activates driver 60 for effecting a return transfer of the information to the associated vacancies in the minor loops.

The control operation terminates with two domains in consecutive positions in loop 50 of FIG. 4. These domains are eliminated prior to a next subsequent control operation. One practical implementation for eliminating the domains is to employ a domain annihilator in a position next to that occupied by detector D3 for selective annihilation of the domains after the domains in the major loop of the memory are returned to minor loops. The encircled A in FIG. 4 represents such an annihilator selectively activated by pulser 70 in response to alternate signals from detector D3 (indicating that the detector has detected a two-domain sequence for a second time). Pulser 70 may be assumed to include circuitry such as a flip-flop for this purpose.

It is contemplated that the entire operation of the illustrative arrangements and the requisite functions required therein, as represented, be realized in a field access mode. Consequently, all the various loops, transfer ports, annihilators, generators, etc. are compatible and are synchronized with one another and with a field access, major-minor memory of present by a rotating in-plane field common to field access operation. Moreover, the various functions and their implementations in the field access mode are either disclosed elsewhere or adaptations of those disclosed elsewhere and are not described fully herein.

To recapitulate, a code translator in accordance with the invention comprises first and second closed loop domain channels having numbers of stages which are relatively prime. The translator provides a timing signal in a selected one of a number of possible time slots where the possible number of time slots is determined by the product of the numbers of stages in the two channels and the selected time slot is determined by the number of stages separating a reference stage in each loop and the stages into which domains are initially placed.

The number of external connections necessary for initial placement of domains into the translator is equal to the number of stages in the two loops. But a practical bubble input arrangement organizes those conductors to transfer domains from a single input bubble channel having a single bubble generator and a single bubble annihilator. The reason for this is to permit better utilization of "real estate" (surface area) and to reduce the numbers of generators and annihilators.

The timing signal provided by the translator is controlled by the coincidence of two bubbles at the home positions or reference stages. That coincidence is recognized most simply by a bubble detector at each home position as shown in FIG. 2. But detectors are expensive. Transfer ports are not expensive, and the transfer of a domain from one loop to the other, upon coincident arrival at the home positions, allows a single detector to detect a two-bubble code as shown in FIG. 3.

But rather than establishing a two-bubble code in one of the closed loops of the translator as our timing control, transfer to a third loop is also convenient as shown in FIG. 4. In connection with FIG. 4, the establishment of a two-bubble code in a selected one of 48 (or 56) positions, the utilization of that code to control the selection of stored information in a bubble memory, and the later annihilation of the code is shown.

What has been described is considered merely illustrative of the principles of this invention. Therefore, various modifications can be devised by those skilled in the art in accordance with those principles within the spirit and scope of this invention as encompassed by the following claims.

What is claimed is:

1. A code translator comprising a layer of material in which single wall domains can be moved, means for defining first and second multistage loops for recirculating said domains each including a reference stage, said first and second loops comprising A and B stages, respectively, A and B having no common factor other than unity, means responsive to the simultaneous arrival of a domain in each of said loops at said reference stage for providing a timing signal, means for introducing a domain into a selected stage of each of said loops, and means for moving domains in said loops synchronously.

2. A code translator in accordance with claim 1 including means for detecting the presence of a domain at each of said reference stages.

3. a code translator in accordance with claim 2 wherein said means for detecting comprises a domain detector at each of said reference stages.

4. A code translator in accordance with claim 2 wherein said means for detecting comprises a domain detector at said reference stage in said first loop and means for transferring a domain from said reference stage in said second loop to said first loop in a stage next to that occupied by the domain in said first loop.

5. A code translator in accordance with claim 4 wherein said means for transferring comprises means responsive to the presence of a domain in said reference position of said first loop.

6. A code translator in accordance with claim 1 comprising a third multistage loop, and first means for transferring a domain simultaneously from said reference stage of each of said first and second loops into associated stages of said third loops.

7. A code translator in accordance with claim 6 wherein said first means for transferring comprises means responsive to the presence of a domain at said reference stage of said first loop.

8. A code translator in accordance with claim 7 wherein said first loop and said third loop have a portion of their length including at least said reference stage in common, said portion also including second means for transferring a domain from said third to said first loop responsive to the presence of a domain at said common reference stage.

9. A code translator in accordance with claim 8 including means for inhibiting said second means in response to the presence of a domain in each of said common reference stage and the next subsequent stage of said third loop for permitting movement of those domains about said third loop.

10. A code translator in accordance with claim 9 including means responsive to the detection of domains in consecutive stages of said third loop for selectively annihilating those domains.

* * * * *